United States Patent
Van Wietmarschen

(10) Patent No.: US 12,046,994 B2
(45) Date of Patent: Jul. 23, 2024

(54) DC-DC CONVERTER

(71) Applicant: NEXPERIA B.V., Nijmegen (NL)

(72) Inventor: Luc Van Wietmarschen, Delft (NL)

(73) Assignee: Nexperia B.V., Nijmegen (NL)

( * ) Notice: Subject to any disclaimer, the term of this patent is extended or adjusted under 35 U.S.C. 154(b) by 288 days.

(21) Appl. No.: 17/621,092

(22) PCT Filed: Jun. 22, 2020

(86) PCT No.: PCT/NL2020/050402
§ 371 (c)(1),
(2) Date: Dec. 20, 2021

(87) PCT Pub. No.: WO2020/256555
PCT Pub. Date: Dec. 24, 2020

(65) Prior Publication Data
US 2022/0360166 A1 Nov. 10, 2022

(30) Foreign Application Priority Data

Jun. 21, 2019 (NL) .................................... 2023359

(51) Int. Cl.
*H02M 1/36* (2007.01)
*H02M 1/00* (2006.01)
(Continued)

(52) U.S. Cl.
CPC ........... *H02M 1/36* (2013.01); *H02M 1/0041* (2021.05); *H02M 1/0095* (2021.05); *H02M 3/07* (2013.01); *H02M 3/158* (2013.01)

(58) Field of Classification Search
CPC .... H02M 1/36; H02M 1/0041; H02M 1/0095; H02M 3/07; H02M 3/158
See application file for complete search history.

(56) References Cited

U.S. PATENT DOCUMENTS

2005/0030087 A1  2/2005 Guo
2005/0248386 A1  11/2005 Pan et al.
(Continued)

OTHER PUBLICATIONS

Heitz, Jerome et al., "Modeling and Optimization of a Ker Charge Pump Loaded by a Resistive Circuit", MIXDES 2012, 19th International Conference "Mixed Design and Integrated Circuits and System", May 24-26, 2012, Warsaw, Poland, 6 pages.
(Continued)

*Primary Examiner* — Rafael O De Leon Domenech
(74) *Attorney, Agent, or Firm* — Ruggiero McAllister & McMahon LLC

(57) ABSTRACT

The present invention relates to an electrical power energy converter unit for converting Direct Current to Direct Current, DC-DC, with improved efficiency and cold-start capability. In an aspect there is provided a Direct Current to Direct Current, DC-DC, converter for converting a low-voltage input to a higher-voltage output according to a conversion factor for powering a load such as a wireless sensor node, the converter comprising: a first DC-DC converter circuit arranged for converting the low-voltage input to a first higher-voltage output during a start-up mode of the load; a second DC-DC converter circuit arranged for converting the low-voltage input to a second higher-voltage output during a normal operational mode of the load; a control circuit for control of the conversion factor; wherein each of the first and second converter circuit comprises: an input stage for receiving the low-voltage input; an intermediate stage in series with the input stage for converting the low-voltage input to the first higher-voltage or second higher-voltage output circuit at a conversion factor being defined by the ratio between the input and output; a final stage in series with the intermediate stage for outputting the first higher-voltage or the second higher-voltage output; wherein each of the stages comprises: a shared capacitor for (Continued)

boosting voltage of said low-voltage input to said first higher-voltage output of said first converter or to said second higher-voltage output of said second converter.

19 Claims, 5 Drawing Sheets

(51) Int. Cl.
 *H02M 3/07* (2006.01)
 *H02M 3/158* (2006.01)

(56) References Cited

U.S. PATENT DOCUMENTS

| | | | |
|---|---|---|---|
| 2005/0265052 A1 | 12/2005 | Utsunomiya | |
| 2012/0300552 A1* | 11/2012 | Neto | H02M 3/073 |
| | | | 327/536 |
| 2018/0166987 A1* | 6/2018 | Low | H02M 3/07 |

OTHER PUBLICATIONS

International Search Report mailed Aug. 24, 2020 for PCT/NL2020/050402.

Zeng, Zizhen et al., "A WLAN 2.4-GHz RF Energy Harvesting System with Reconfigurable Rectifier for Wireless Sensor Network", 2016 IEEE International Symposium on Circuits and Systems (ISCAS), IEEE May 22, 2016, pp. 2362-2365.

\* cited by examiner

DC-DC CONVERTER

TECHNICAL FIELD

The present invention relates, in general, to an electrical power energy converter unit for converting Direct Current to Direct Current, DC-DC, with improved efficiency and cold-start capability.

BACKGROUND

An electric power converter is a device which converts electric energy from one form to another form, e.g. from an Alternating Current, AC, to a Direct Current, DC. Electric power converters may also convert a voltage level or a frequency or a combination of both. The present invention in particular relates to DC to DC converters.

DC to DC converters are typically used in portable electronic devices such a cellular phone, laptop computer or portable computers. DC-DC converters are also widely used in Internet-of-Things, IoT, devices or Wireless Sensor Nodes, WSNs. In such applications the main power supply often (primarily) comes from a battery. Many of these devices have electronic circuits and sub-circuits which require different voltage levels from that same battery. DC-DC converters may thus be utilised to provide several supply voltage levels which are obtained from one single power supply with basically one voltage level.

Charge pumps are a specific kind of DC to DC converters which use particular circuit layouts to increase (or lower) the voltage level through several stages. Charge pumps, especially of a particular kind, are known for having a high efficiency in conversion without requiring a large number of electric components. Such high conversion efficiency is a typical requirement within the field of IoT devices since lifetime of the device needs to be sufficient that no or almost no battery replacement is required, e.g. to be able to provide a plug-and-forget IoT device.

Moreover, the footprint and/or bill of materials should be small as well. Replacing the battery is undesirable since it takes time, off-line time of the device, human interference, is relatively costly (when compared to the other basic electric components often used in the device), and above all, is very environment unfriendly.

To decrease the dependency from the battery the popularity of energy harvesters for providing power to the IoT devices rapidly increases. The output power and especially the voltage level from the energy harvesters may however not be sufficient for typical IoT applications. Therefore, DC-DC converters are required for boosting low input voltages from the energy harvesters.

DC-DC converters are known and available with a variety of requirements, which may be optimized for particular purposes such a high conversion factors or high efficiency. In known DC-DC converters however there always is a trade-off between these optimizations like efficiency or cold-start capability. In IoT and WSN applications it is however preferable that both requirements are met.

In view of the above, there is a need for an electrical power energy converter unit for converting Direct Current to Direct Current, DC-DC, with improved efficiency and cold-start capability.

SUMMARY

It is an object of the present invention to provide an electrical power energy converter unit for converting Direct Current to Direct Current, DC-DC, with improved efficiency and cold-start capability.

This object is, in a first aspect of the invention, provided by a Direct Current to Direct Current, DC-DC, converter for converting a low-voltage input to a higher-voltage output according to a conversion factor for powering a load such as a wireless sensor node, the converter comprising:
- a first DC-DC converter circuit arranged for converting the low-voltage input to a first higher-voltage output during a start-up mode of the load;
- a second DC-DC converter circuit arranged for converting a second low-voltage input to the higher-voltage output during an normal operational mode of the load;
- a control circuit for control of the conversion factor; wherein each of the first and second converter circuit comprises:
- an input stage for receiving the low-voltage input;
- an intermediate stage in series with the input stage for converting the low-voltage input to the first higher-voltage or the second higher output circuit at a conversion factor being defined by the ratio between the input and output;
- a final stage in series with the intermediate stage for outputting the first higher-voltage or the second higher-voltage output; wherein each of the stages comprises:
- a shared capacitor for boosting voltage of said low-voltage input to said first higher-voltage output of said first converter and to said second higher-voltage output of said second converter.

Electric power converters may be arranged to convert an input DC voltage into a certain DC output voltage. The conversion ratio between the input and output voltage level is determined by the configuration of the converter and is limited. The voltage level can only be converted by a maximum ratio. Such a high ratio is often required if the energy source provides a very low, e.g. mV, voltage level, and the load requires much higher levels, e.g. 1V to 5V, which may be typical for Internet-of-Things, IoT, devices and Wireless Sensor Nodes, WSNs which may be powered, e.g. as an auxiliary power source, by an energy harvester.

For IoT or WSN devices that are powered (primarily) from an energy harvesting source, such high conversion factors or conversion ratio's may thus be required since the application is dependent on the low input voltage of the energy harvester. Without the energy harvesters, the IoT or WSN will typically depend to heavily on its primary power supply, i.e. the battery, such that battery replacement is required over a certain time period. The use of the energy harvester may thus significantly postpone or even completely remove the need for replacement of the battery.

In order for the energy harvester to be effective, the DC-DC converter preferably is capable of cold-start. Typically, cold-start capable converters are not the most efficient converters. Other DC-DC converters however may be efficient, but cannot achieve cold-start. As such, there is a trade-off between energy efficiency and cold-start capability.

IoT and WSN devices with energy harvesters may be configured to have different operating modes. In, for example, a first operating mode, the circuit or load may be starting-up and in a second operating mode, the circuit may be (fully) operational. In the first mode the input voltage of the energy harvester may be very low. The energy harvester may, during this first start-up phase, have a battery which fails to provide a sufficient output voltage for the energy harvester to operate, e.g. due to a fully depleted battery or upon a first start-up of the energy harvester after fabrication thereof. Accordingly, a DC-DC converter is needed in this phase which is able to start-up the energy harvester system under these challenging conditions. In the second mode the circuit may be operational in a normal running modus operandi, i.e. once the energy harvester has been started. In this second phase a high efficiency is required or desirable. The conversion ratio may be higher than in the first phase, or may also be equal or lower. Accordingly, a more efficient converter may be chosen for better and more efficient use of the energy obtained from the energy harvester.

An energy harvester system should thus be able to convert the low voltage level input under both conditions, i.e. boosting the voltage to a first higher-voltage during startup mode as well as boosting the voltage to a second higher-voltage during the subsequent normal operational mode.

As indicated in the background part of the description, charge pumps are DC-DC converters which provide a voltage which is higher than the voltage of the power supply, or in case of energy harvesters, of the input voltage of the harvester. Charge pumps are available in a variety of designs with a variety of optimizations. There are, for example, charge pumps designs known with a high efficiency, whereas other designs are optimized cold-start capability.

In order to convert DC to DC in a IoT or WSN application with an energy harvester under both the cold-start capability and high efficiency, e.g. in correspondence with the different operational modes as indicated above, two different charge pump designs may be combined.

A first charge pump optimized for cold-start capability and a second charge pump for high efficiency may be combined by implementing both circuit designs in the converter. With such a combined design, the footprint and bill of materials will also double or at least significantly increase. In miniature design applications typical for IoT or WSN devices, this is undesirable.

It, however, was the insight of the inventor that both circuit designs, i.e. a first start-up capable boosting charge pump circuit layout and a second normal harvesting operational modus efficiency optimized charge pump circuit layout may be combined in a more efficient manner. One of the most important components of both charge pump designs are the capacitors for boosting the low-voltage input to a higher-voltage output. Since both designs typically have a first input stage, intermediate stage and final stage with corresponding capacitors, these capacitors may be shared between the designs.

With the proposed design, a first DC-DC converter circuit arranged for converting said low-voltage input to a first higher-voltage output during a start-up mode may be combined with a second DC-DC converter circuit arranged for converting said low-voltage input to a second higher-voltage output during an normal operational mode by sharing the corresponding capacitors for boosting voltage. With the combination of designs there is no or limited trade-off between the cold-start capability and the efficiency, whereas the overall footprint and the bill of materials is kept to a minimum.

In an example, the first DC-DC converter circuit comprises a Dickson charge pump layout. The Dickson charge pump layout comprises at least a first stage, one or multiple intermediate stages, and a final stage. Each stage comprises a diode or components which functions as a diode to prevent current in a certain direction. The diode is connected in series between the stages. Connected to the diode and in between the stages a capacitor is connected in series with a clock signal. Capacitors of subsequent stages are controlled by different clock signals, e.g. a first and a second clocks signal from an oscillator. By each (intermediate) stage the voltage level is increased with the voltage level of the clock signal. Such a Dickson charge pump may have several intermediate stages to further increase the conversion ratio to a desired level. In a further example, the diodes may be replaced by charge transfer switches or dynamic charge transfer switches. This may allow more efficient conversion. The charge transfer switches may utilise a NMOS transistor that is driven by the voltage of a later stage. Use of the voltage of the later stage allows for better conduction as this voltage is higher. The dynamic charge transfer switches are an adjustment to the charge transfer switches to lower the leakage current thereof. In a normal charge transfer switch the gate voltage will not reach a low potential, thus the NMOS will leak when it should be off. The dynamic charge transfer switch dynamically switches the NMOS gate potential to that of a later stage or that of an earlier stage when it should be off. This may be implemented using an inverter that is controlled by the output voltage of the charge transfer switch.

Alternatively, the charge transfer switches may also utilise a PMOS transistor that is driven by the voltage of an earlier stage. In that case, the normal charge transfer switch the gate voltage will not reach a high potential, thus the PMOS will leak when it should be off. The dynamic charge transfer switch dynamically switches the PMOS gate potential to that of an earlier stage or that of a later stage when it should be off. This may be implemented using an inverter that is controlled by the input voltage of the charge transfer switch.

In an example, the second DC-DC converter circuit comprises a Series-parallel charge pump layout. The Series-parallel charge pump layout is a different type of charge pump and is optimized for efficiency, or at least more efficient that the Dickson charge pump. The Series-parallel charge pump also has a first (input), intermediate (conversion) and final (output) stage. Each stage comprises switches, controlled by clock signals, e.g. oscillator signals, and a capacitor. The capacitors of the Series-parallel charge pump are placed in a chain and connected to each other through the switches. The oscillator which preferably has two or at least two phases controls the switches. In the first phase all capacitors are connected in parallel and are charged to the input voltage. In the next phase the capacitors are connected in series and each capacitor pushes the voltage of the following capacitor up by the input voltage. The resulting output voltage is the input voltage times the number of capacitors used.

In an alternative example, the second DC-DC converter circuit comprises a Makowski charge pump layout. Although the topology of the Makowski charge pump is the same as the Series-parallel charge pump, the manner of switching is different. In the Makowski switching scheme, the first capacitor is connected in parallel with the source first. In the next phase, the capacitor is connected in series with the input and the voltage is doubled. During this phase, the second capacitor is put in parallel with the first capacitor and with the input source and is thus charged to the doubled voltage. In the third phase, the second capacitor is put in series with the first capacitor and the input source and thus the voltage is quadrupled. The resulting output voltage is the input voltage times two to the power N, where N is the number of capacitors used.

In an example, the intermediate stage is comprised of multiple intermediate stages. The amount of intermediate stages is defined by the required conversion ratio. As such, there could for example be two, three, four, five, six, seven, eight, nine, ten or even more intermediate stages.

In an example, the control circuit comprises at least a first and a second clock signal for control of the stages of the first DC-DC converter circuit, and wherein the second clock signal is comprised of the inverse of the first clock signal. In an example the clock signals for inputting in the stages of the first and second charge pump circuits may be shared between these circuits. For example, a signal oscillator may be used with a first and second (for example inverted) output clock signal. The first and second clock signal may drive the stages of both the first charge pump and the second charge pump, accordingly in a first initial startup modus and subsequent second operational modus.

In an example, the control circuit comprises at least a first and a second clock signal for control of the stages of the second DC-DC converter circuit. Although the oscillator may control the clock signals of both circuits in a corresponding manner, the oscillator may in another preferred example provide separate clock signals for the first and for the second charge pump circuits. In this example, the oscillator provides two clock signals. One to drive the first cold-start converter circuit that is also cold-start capable itself, and the other one to drive the second more efficient converter circuit, but requiring a charged battery to operate. Preferably, each clock signal may have its own oscillator, or at least those clock signals which cannot be obtained from an inverse existing clock signal from an oscillator may have its own oscillator.

In an example, the first and second clock signal of the first DC-DC converter correspond to the first and second clock signal of the second DC-DC converter respectively.

In an example, the first and second clock signal drive switching means of a stage of the stages of the second DC-DC converter circuit.

In an example, the switching means comprise diodes. In a simplistic design the switching means may be implemented by diodes.

In an example, the switching means comprise charge transfer switches. These charge transfer switches are preferably dynamic charge transfer switches. In a more sophisticated design these may also be implemented by charge transfer switches or even more preferred, by dynamic charge transfer switches. With such charge transfer switches higher efficiency may be realised. The charge transfer switches may be implemented by an NMOS transistor, preferably driven by the voltage of a later stage. This allows for better conduction as this voltage is higher. The dynamic charge transfer switches further lower the leakage current. The dynamic charge transfer switch dynamically switches the NMOS gate potential to that of a later stage or that of an earlier stage when it should be off. This may be implemented using an inverter that is controlled by the output voltage of the charge transfer switch. The charge transfer switches may also be implemented by a PMOS transistor, preferably driven by the voltage of an earlier stage. This allows for better conduction as this voltage is lower. The dynamic charge transfer switches further lower the leakage current. The dynamic charge transfer switch dynamically switches the PMOS gate potential to that of an earlier stage or that of a later stage when it should be off. This may be implemented using an inverter that is controlled by the input voltage of the charge transfer switch In an example, the switching means further comprise at least one additional switch, and wherein the at least one additional switch comprises an NMOS or PMOS transistor.

In an example, the capacitor of each stage, shared between the first and second DC-DC converter circuits, comprises multiple capacitors, and wherein the multiple capacitors may differ in capacitance. The multiple capacitors may however also have the same capacitance.

A challenge with sharing the capacitors between the first and second charge pump circuits is that both will have a non-optimal capacitance available. The first charge pump circuit for the startup or cold-start may require more stages and therefor more capacitors than that of the second charge pump circuit for the operational modus. Splitting up the capacitor in multiple capacitors allows for both charge pump designs to be designed with a different number of stages.

In an example, the control circuit preferably comprises additional switching means for enabling at least one capacitor of the multiple capacitors. Splitting up the capacitors may bring forward additional challenges where the switches that split up the capacitors are preferably passively turned off during the cold-start or startup phase, as no control signals are available. This may be realized with the additional switching means.

In an example, the switching means comprise NMOS and/or PMOS transistors being driven by the control circuit. NMOS switches can be passively turned off during the startup or cold-start phase. PMOS may not. The inverter that controls the PMOS switches overcomes this challenge and can be passively connected to ground during that phase.

In an example, the converter further comprises a voltage booster circuit arranged for boosting said low-voltage input to a level for switches of said control circuit to operate upon said determining said low-voltage input is below an input voltage threshold value.

In an example, the input voltage threshold value corresponds to a minimum voltage level required for a control switch to operate for driving the first DC-DC converter circuit. A further challenge is to connect the startup phase clock signals to the capacitors. The clock signal should be conducted in the startup phase, but should pose a high impedance in the normal operational phase. In case the voltage is however too low, e.g. below a threshold value, the clock signal will not be conducted. A further input voltage booster circuit may aid this and may be implemented as a small and simple circuit which is only activated if the input voltage drops below the threshold value, as it only needs to keep a constant non-switching voltage.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION OF THE DRAWINGS

The Direct Current to Direct Current, DC-DC converter according to the invention comprises two DC-DC circuits for two different purposes. In Internet of Things, IoT or Wireless Sensor Node, WSN, applications there is a desire for plug-and-forget use. What that means is, that after fabrication the IoT device or WSN can be installed and used without ever having to replace the battery or perform other types of maintenance or services. Especially for IoT and WSN applications with energy harvesters this is challenging.

Such energy harvester systems typically will require an efficient conversion of energy from the harvesting to power the device or load, e.g. a sensor, wireless module, etc. and to charge the battery. Although the device may be equipped with a (pre)charged battery, the battery will deplete over time. Hence, if there is a certain amount of time between fabrication and taking the system into use, the battery may become depleted to such a level that there is insufficient energy to startup or boot the system. Extra measures have to be taken to prevent this. These measures could be employed through external devices which may charge the battery for this need. The system could also have an additional module which is included in the device and which will bring the device or system to life upon a depleted battery. Such a situation in which the system may need extra help in order to startup is referred to as a cold-start or startup stage of the system. The cold-start or startup stage may not only be required in case of a long time period between fabrication and installation and hence operation of the system, but also if the energy harvesting is insufficient for a certain period of time, i.e. if there are insufficient Radio Frequency, RF signals in case of a RF harvester, or in case of insufficient sunlight in case of a Photovoltaic harvester.

Figure 1:
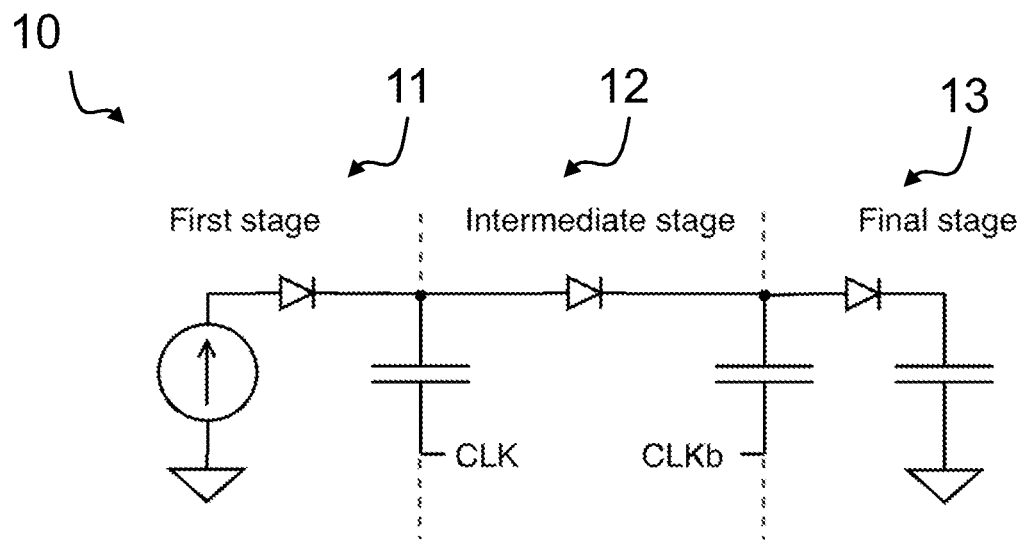
FIG. 1 shows an embodiment of the first DC-DC converter circuit comprising a Dickson charge pump layout.

In the startup or cold-start is required if the energy level is fully depleted, e.g. to such a degree that the system has insufficient power to generate control signals, for example to control the switches. If the energy is not available, energy converters that use switches cannot be operated. During such conditions a different modus operandi is required than if such limitations do not apply. In the absence of sufficient energy to power the control circuit of the system, an energy conversion is needed which does not depend on the switches. Such a design is demonstrated in FIG. 1. FIG. 1 discloses a first DC-DC converter circuit 10 which is arranged for converting of a low-voltage input to a higher-voltage output during a start-up mode of the system, hence under the restrictions of depleted energy levels. The DC-DC converter 10 of FIG. 1 is a (general) Dickson charge pump type of DC-DC converter which is does not depend on or require switches and thus can be operational under the limited depleted energy levers, even below a minimum threshold value required for operating such switches.

The first DC-DC charge pump 10 shown in FIG. 1 has three (types of) stages. A first stage 11, an intermediate stage 12 and a final stage 13. The intermediate stage 12 can be expended to multiple intermediate stages according to the required conversion ratio, thus the ratio between the input and output voltage.

The first DC-DC charge pump 10 comprises multiple capacitors which are connected in a chain from the source, input voltage to the output voltage. The top plate of each capacitor is connected with a diode to the next capacitor in the chain. The diodes allow current to flow in only one direction. The oscillator signal contains two phases that are opposing. The two phases are connected to the bottom plates of the capacitors, thus pushing the voltage of the top plate up and down along with the oscillator signal. All even numbered capacitors are connected to one phase and the odd numbers to the other phase. When the oscillator signal pushes the voltage of one capacitor high and the next capacitor low, charge will flow from the first to the next capacitor through the diode. When the oscillator then pushes the voltage of the next capacitor up, the charge will not flow back as the diode only allows flow in one direction. Instead the charge will be pushed up with the clock signal creating a higher voltage at the top plate of the capacitor than what was available from the source. The next capacitor is charged to the higher voltage and the process repeats. This process repeats with each capacitor in the chain, thus boosting the voltage along the chain.

The diodes require a certain voltage difference at both terminals to start conducting, therefore low voltage clock signals will not be able to push voltages through the diodes effectively. Charge transfer switches and dynamic charge transfer switches are an adaptation to overcome this threshold.

The charge transfer switches are a replacement of the diodes that allows for faster conversion. The charge transfer switches may utilise a NMOS transistor that is driven by the voltage of a later stage, using the voltage of a later stage allows for better conduction as this voltage is higher. They however may also utilise a PMOS transistor that is driven by the voltage of an earlier stage.

Once the limiting conditions of the depleted energy levels, e.g. low battery power, are over, the system may operate under a normal operational modus operandi. In this modus there is sufficient power to operate the switches and so on. Hence, there are no limitation towards implementation of switches of certain types. Accordingly, and since the proposed Dickson charge pump is not very efficient, a more efficient DC-DC converter circuit may be used. Such a converter is demonstrated in FIG. 2 the second DC-DC converter circuit 20. This circuit 20 comprises a series-parallel or Makowski charge pump. Both having the same layout 20 but having different control or timing scheme. The general lay-out is given in FIG. 2. Just like FIG. 1, the first DC-DC converter circuit, the second DC-DC converter circuit also comprises a first 21, intermediate 22 and final stage 23, and just like the first circuit 10, the second 20 may also comprise multiple intermediate stages 22.

The capacitors are placed in a chain and connected by the switches. An oscillator with two phases controls the switches. In the first phase all capacitors are connected in parallel and charged to the input voltage. In the next phase the capacitors are connected in series and each capacitor pushes the voltage of the following capacitor up by the input voltage. The resulting output voltage is the input voltage times the number of capacitors used.

Figure 2:
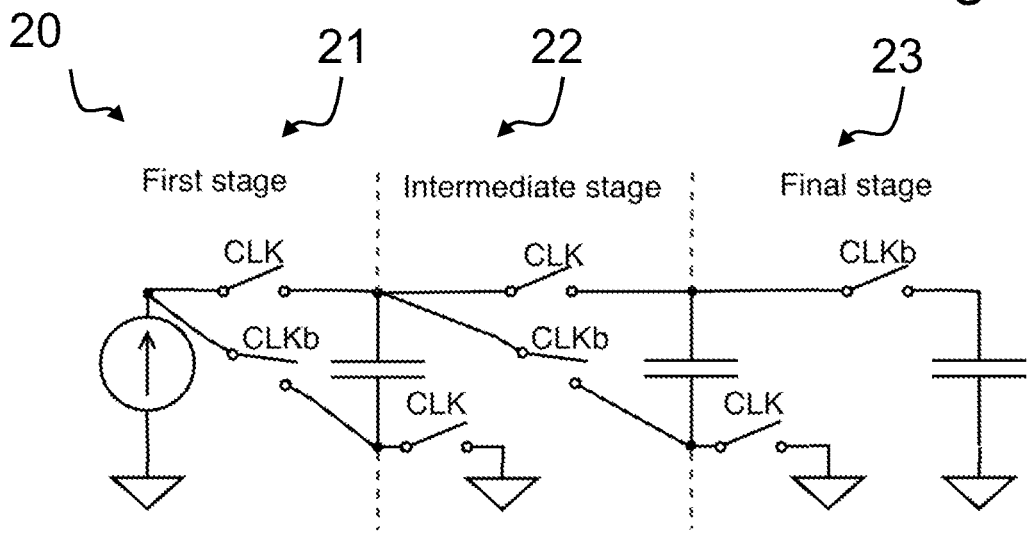
FIG. 2 shows an embodiment of the second DC-DC converter circuit comprising a General series-parallel or Makawski charge pump layout.

As indicated, the second DC-DC converter may also comprise a Makowski charge pump which may have a circuit layout similar to the series-parallel and as demonstrated in FIG. 2. Once again, the capacitors are placed in a chain from the source to the output. Each capacitor is connected to the next capacitor with the switches. The switches are turned on or off by the oscillator signal. The oscillator has multiple phases, so the switches are only one at different times during one clock cycle. The switches are driven in such a manner that the first capacitor is charged to the voltage of the source. Then the bottom plate of that capacitor is connected to the source, pushing the top plate voltage to twice the source voltage. The next capacitor in the chain is now connected to the top plate of the first capacitor and thus charged to twice the source voltage. Next the bottom plate of the capacitor is connected to the previous capacitor and the top plate voltage is pushed to four times the input voltage. This process can be repeated for more capacitor, each doubling the output voltage. The timing scheme and general layout of a two (intermediate) stages are demonstrated in FIG. 8.

Figure 3:
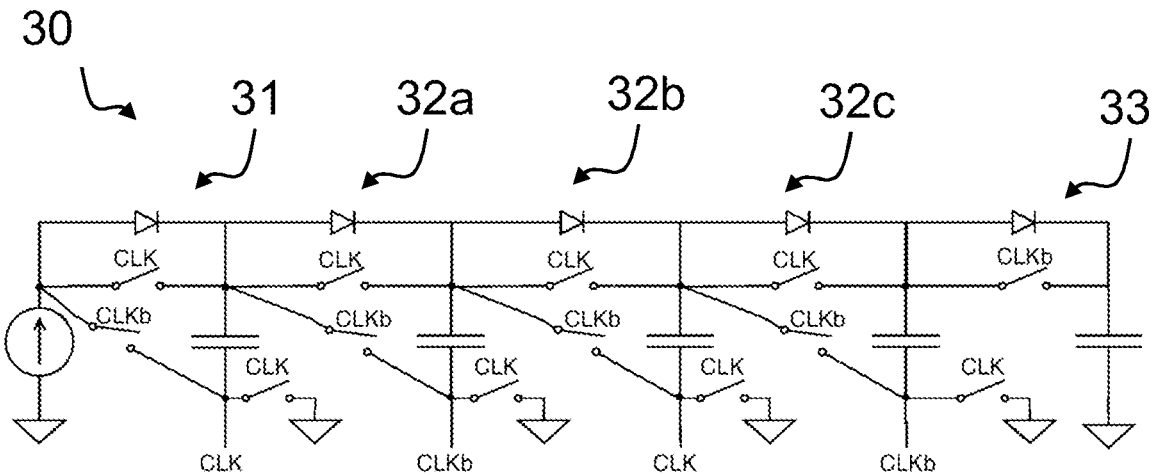
FIG. 3 shows an embodiment of a combination of the first and second DC-DC converter circuits according to the invention.

In FIG. 3 the two circuit layouts 10, 20 of FIGS. 1 and 2 are combined in a combined or hybrid design. As can be seen, both the first 10 and second 20 DC-DC converters are combined and (both) circuits have a first 31, three intermediate 32*a*, 32*b*, 32*c*, and final stage 33. Both circuits share the capacitance, i.e. one or multiple capacitors.

By combining these two types of charge pumps, the right or optimal charge pump may be utilized for the right situation. Hence, the cold-start first charge pump 10 is optimal if cold-start is required due to circumstances in which the power level is too low, and the more efficient second charge pump 20 may be used if there is sufficient power for the control signals such that a more efficient converter layout may be utilized. Normally only one of the two charge pumps is used in a system or both are used next to each other. In the first case there is either no cold-start capability or the energy harvesting is very inefficient. In the second case two pumps are needed for one system and thus double the area is required. Especially cold-start charge pumps are large as they often require a lot of capacitors. With the proposed design both advantages are available within the same area of only one of the charge pumps. Thus, footprint and bill of materials are kept low. Especially for low power IoT and WSN applications this is a key feature which significantly contributes to plug&forget capabilities of the device. The proposed design has several advantages over the prior art: Advantages, e.g. it's ability to combine a high efficiency charge pump with a cold-start charge pump utilising the same capacitors for both pumps, dynamic charge transfer switches can be applied to the design with minor adaptation, the circuit can cold-start, thus is driven by passive signals, the design can be fully integrated without external components, high conversion efficiency can be achieved in normal operation (>85%), chip area reduction while achieving the same pumping capabilities, chip area reduction leads to cost reduction of chip production, and the number of stages can differ between the pumps, thus allowing more design freedom.

Figure 4:
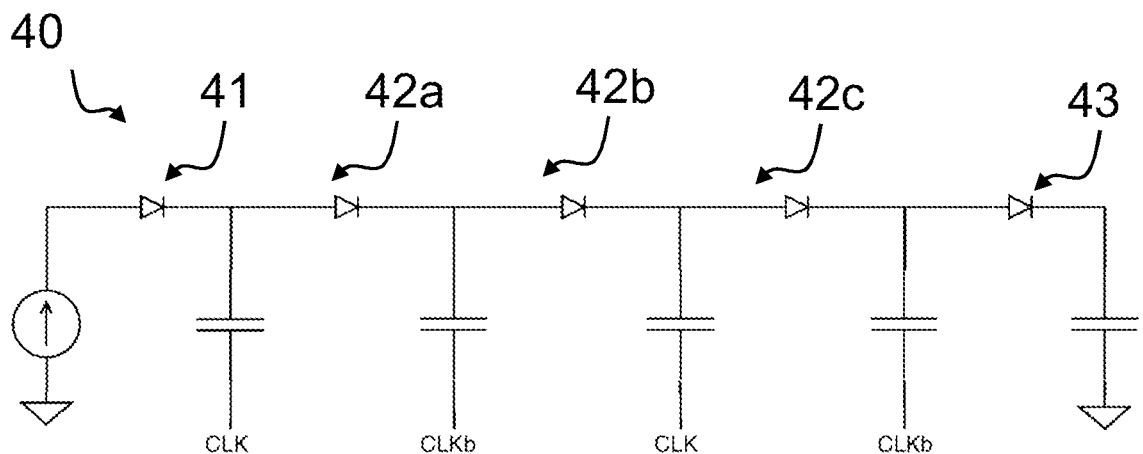
FIG. 4 shows an embodiment of a combination of the first and second DC-DC converter circuits according to the invention during a start-up mode.

In FIG. 4 the combined design 40 as shown in FIG. 3 is demonstrated in the cold-start or start-up modus. Hence in which the first DC-DC converter circuit is active, and the second is inactive. All switches of FIG. 3 are currently open during this modus and thus not shown. As can been seen, the design reduces to a Dickson charge pump of which has proven to be useful and effective.

Figure 5:
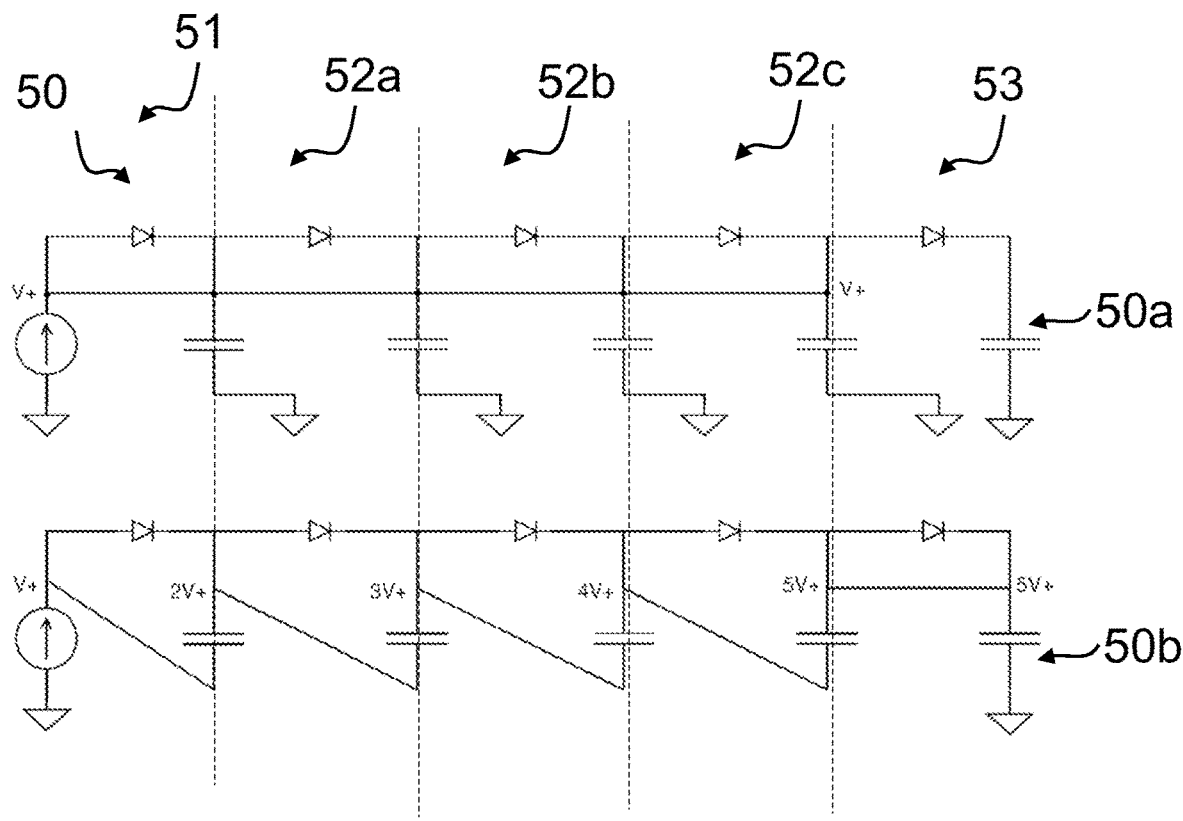
FIG. 5 shows an embodiment of a combination of the first and second DC-DC converter circuits according to the invention during a normal operational mode.

FIG. 5 demonstrates the combined design 50 of FIG. 3, in series-parallel operation with two phases. Hence in which the second DC-DC converter circuit is active, and the first is inactive. First the charging phase where CLK is high and the corresponding switches from FIG. 3 are closed and thus drawn as connections. Below that, the boosting phase is shown where CLKb is high and the corresponding switches are drawn as connections.

Figure 6:
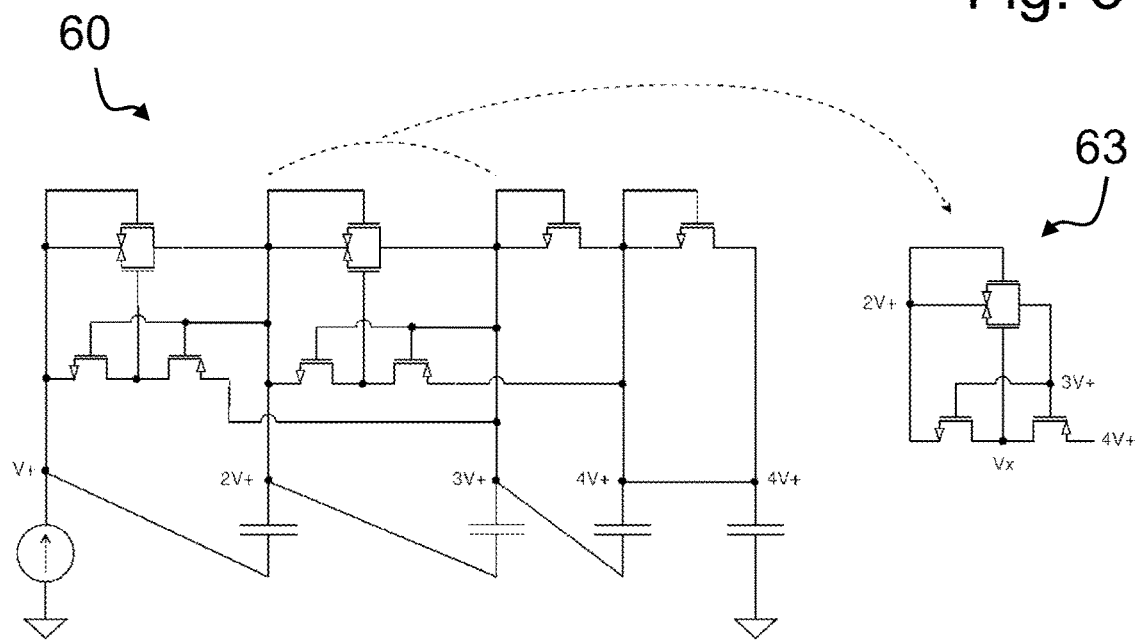
FIG. 6 shows the embodiment shown in FIG. 5 but with implementation of dynamic charge transfer switches.

FIG. 6 shows the boosting phase of FIG. 5 again, but with the diodes implemented by Dynamic Charge Transfer Switches (DCTS). During this phase no current should be flowing from right to left through the DCTS for better performance. The arrow zooms in 63 on one DCTS and shows the potentials at all terminals. From this it can be concluded that the DCTS is not turned off and will leak. The last two stages do not utilise DCTS as there is no later stage that can drive them.

Figure 7:
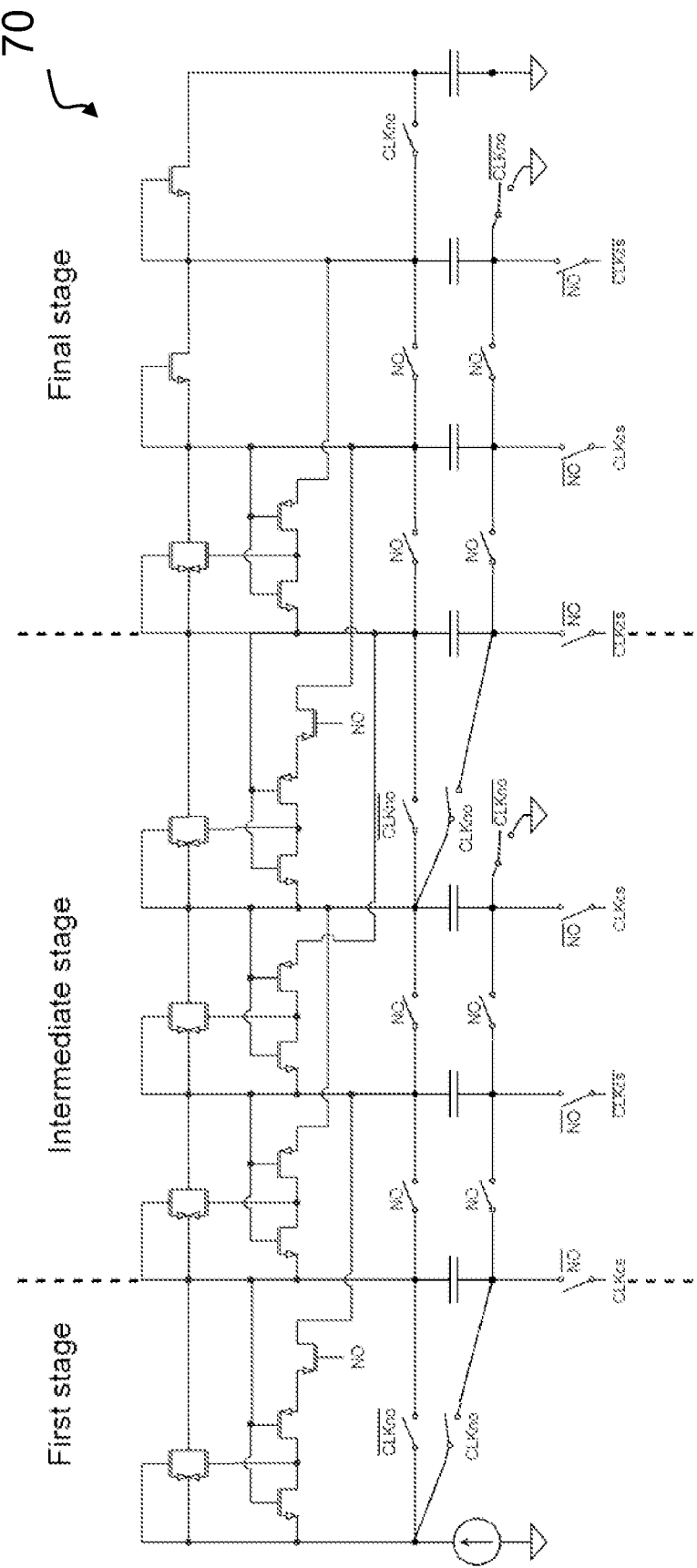
FIG. 7 shows an embodiment of the invention with multiple capacitors per stage.

FIG. 7 shows the complete proposed 70 design with capacitors split in three and DCTS applied. Only the DCTS that are parallel to the clock driven switches require one additional NMOS to not leak during normal operation.

Figure 8:
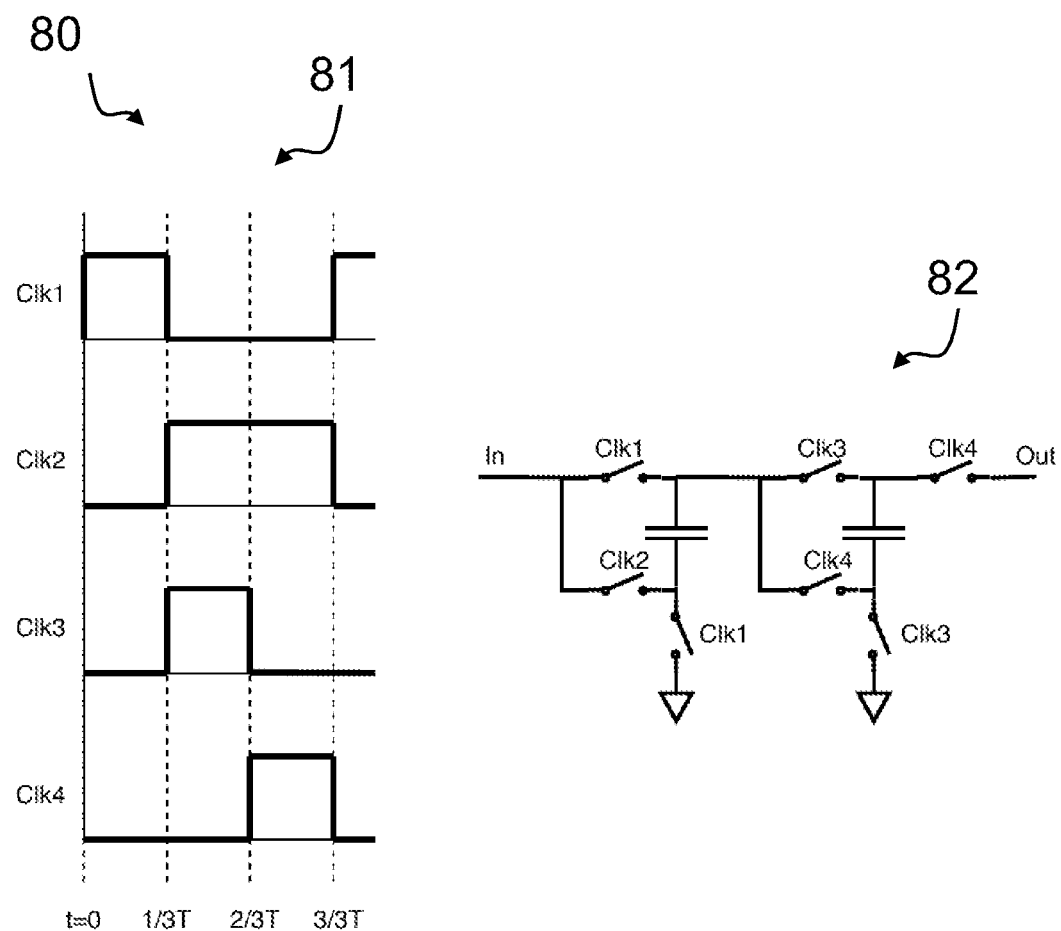
FIG. 8 shows an example of the second DC-DC converter circuit with Makowski timing scheme for the charge pump.

FIG. 8 shows the Makowski timing scheme 81 for a two-stage charge pump 82 and the signal locations indicated. As can be seen the topology is identical to that of a series-parallel charge pump, only the control signals differ.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that the stages of the converter comprise switches and that these switches can be embodied by several types of switches known in the art, such as but not limited to transistors, field-effect transistors, MOSFET, NMOS, etc.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single stage of the circuit or other unit may fulfil the functions of several items recited in the claims. The mere fact that certain measures are recited in mutually different dependent claims does not indicate that a combination of these measured cannot be used to advantage. Any reference signs in the claims should not be construed as limiting the scope thereof.

The invention claimed is:

1. A Direct Current to Direct Current (DC-DC) converter configured to convert a low-voltage input to a higher-voltage output according to a conversion factor for powering a load, comprising:
    a first DC-DC converter circuit configured to convert the low-voltage input to a first higher-voltage output during a start-up mode of the load;
    a second DC-DC converter circuit configured to convert the low-voltage input to a second higher-voltage output during a normal operational mode of the load; and
    a control circuit configured to control the conversion factor;
    wherein each of the first and second converter circuits comprises:
        an input stage configured to receive the low-voltage input;
        an intermediate stage in series with the input stage configured to convert the low-voltage input to the first higher-voltage or the second higher-voltage output circuit at the conversion factor defined by a ratio between the input and output; and a final stage in series with the intermediate stage configured to output the first higher-voltage or the second higher-voltage output;

wherein each of the stages comprises a shared capacitor configured to boost voltage of the low-voltage input to the first higher-voltage output of the first converter and to the second higher-voltage output of the second converter.

2. The DC-DC converter according to claim 1, wherein the first DC-DC converter circuit comprises a Dickson charge pump layout.

3. The DC-DC converter according to claim 1, wherein the second DC-DC converter circuit comprises a Makowski charge pump layout.

4. The DC-DC converter according to claim 1, wherein the second DC-DC converter circuit comprises a Series-parallel charge pump layout.

5. The DC-DC converter according to claim 1, wherein at least one of the first and second DC-DC converter circuits comprises a plurality of the intermediate stages.

6. The DC-DC converter according to claim 1, wherein the control circuit comprises at least a first and a second clock signal configured to control the stages of the first DC-DC converter circuit, and wherein the second clock signal is comprised of the inverse of the first clock signal.

7. The DC-DC converter according to claim 1, wherein the control circuit comprises at least a first and a second clock signal configured to control the stages of the second DC-DC converter circuit.

8. The DC-DC converter according to claim 6, wherein the first and second clock signals of the first DC-DC converter correspond to the first and second clock signals of the second DC-DC converter, respectively.

9. The DC-DC converter according to claim 7, wherein the first and second clock signals drive switching means of a stage of the stages of the second DC-DC converter circuit.

10. The DC-DC converter according to claim 7, wherein the first and second clock signals drive switching means of a stage of the stages of the first DC-DC converter circuit.

11. The DC-DC converter according to claim 10, wherein the switching means comprises charge transfer switches.

12. The DC-DC converter according to claim 11, wherein the switching means further comprise at least one additional switch, and wherein the at least one additional switch comprises an NMOS or PMOS transistor.

13. The DC-DC converter according to claim 1, wherein the capacitor of each stage, shared between the first and second DC-DC converter circuits, comprises multiple capacitors, and wherein the multiple capacitors differ in capacitance.

14. The DC-DC converter according to claim 13, wherein the control circuit comprises additional switching means for enabling at least one capacitor of the multiple capacitors.

15. The DC-DC converter according to claim 9, wherein the switching means comprises NMOS and/or PMOS transistors driven by the control circuit.

16. The DC-DC converter according to claim 1, further comprising a voltage booster circuit configured to boost the low-voltage input to a level for switches of the control circuit to operate upon the determining the low-voltage input is below an input voltage threshold value.

17. The DC-DC converter according to claim 16, wherein the input voltage threshold value is set to correspond to a minimum voltage level required for the clock signal to operate for driving the first DC-DC converter circuit.

18. The DC-DC converter according to claim 1, wherein the load is a wireless sensor node.

19. The DC-DC converter according to claim 11, wherein the charge transfer switches are dynamic charge transfer switches.

* * * * *